United States Patent [19]

Snitzer et al.

[11] 4,428,523

[45] Jan. 31, 1984

[54] METALLIC SOLDER COMPOSITE BONDING

[75] Inventors: Elias Snitzer, West Hartford; James F. Bacon, Manchester, both of Conn.

[73] Assignee: United Technologies Corporation, Hartford, Conn.

[21] Appl. No.: 338,823

[22] Filed: Jan. 11, 1982

Related U.S. Application Data

[62] Division of Ser. No. 215,283, Dec. 12, 1980, Pat. No. 4,350,744.

[51] Int. Cl.³ .............. B23K 31/02; C03C 27/04; B32B 17/06
[52] U.S. Cl. .................. 228/121; 228/124; 156/182; 156/306.6; 156/308.2; 156/307.7; 156/325; 428/433; 428/631; 428/666; 428/672; 428/434; 428/367; 428/630; 428/334; 428/335
[58] Field of Search ............... 428/336, 334, 335, 367, 428/389, 390, 426, 428, 902, 663, 666, 672, 630, 428/631, 939, 433; 156/182, 306.6, 308.2, 325, 307.7; 228/121, 122, 124

[56] References Cited

U.S. PATENT DOCUMENTS

| | | | |
|---|---|---|---|
| 3,624,894 | 12/1971 | Miller | 228/121 |
| 3,857,161 | 12/1974 | Hutchins | 228/121 |
| 3,921,885 | 12/1975 | Knox | 228/121 |
| 4,018,374 | 4/1977 | Lee | 228/121 |
| 4,263,367 | 4/1981 | Prewo | 428/338 |
| 4,265,968 | 5/1981 | Prewo | 428/336 |

*Primary Examiner*—Ellis P. Robinson
*Attorney, Agent, or Firm*—Harry J. Gwinnell

[57] ABSTRACT

A method of bonding a plurality of thermally stable high strength graphite fiber reinforced glass matrix composite pieces is described. The process comprises applying to the surfaces to be bonded at least one layer of a metal which is highly adherent to the composite and the solder and is oxidatively stable. A tie layer may be used between the composite bond surface and the metal layer to better bond the metal layer to the composite. Following application of the metal layer, the composite pieces are stacked with the metal layers facing each other and a solder layer in between. The temperature of the assembly is raised to melt the solder and form the bond. The melting temperature of the solder and the metal layers are chosen so as to be higher than the use temperature of the bonded composite. A bonded composite article thus formed is also described.

7 Claims, 1 Drawing Figure

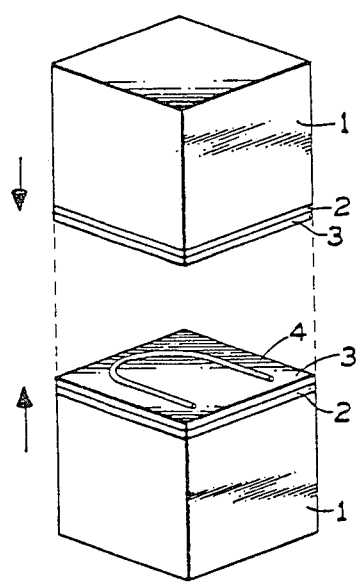

METALLIC SOLDER COMPOSITE BONDING

The Government has rights in this invention pursuant to Contract No. NAS1-14346 awarded by the National Aeronautics and Space Administration.

CROSS REFERENCE TO RELATED APPLICATIONS

This is a division of application Ser. No. 215,283 filed on Dec. 12, 1980, now U.S. Pat. No. 4,350,744.

Attention is directed to commonly assigned copending U.S. patent application Ser. No. 215,282 filed Dec. 12, 1980, now U.S. Pat. No. 4,353,966 entitled "Composite Bonding" which discloses a method of bonding fiber reinforced composite materials.

Attention is also directed to commonly assigned, copending U.S. patent application Ser. No. 215,281, filed Dec. 12, 1980 now U.S. Pat. No. 4,358,512 entitled "Metal Composite Bonding" which discloses a method of bonding graphite fiber reinforced glass and metal.

DESCRIPTION

TECHNICAL FIELD

The field of art to which this invention pertains is adhesive bonding and specifically adhesive bonding of composite materials.

BACKGROUND ART

A new class of composite materials has recently appeared in the composite art. This new material is graphite fiber reinforced glass. This new material, as described in commonly assigned copending U.S. patent application Ser. Nos. 54,098, filed July 2, 1979, now abandoned; 92,168, filed Nov. 7, 1979, now U.S. Pat. No. 4,263,367; and 135,375, filed Mar. 28, 1980, now U.S. Pat. No. 4,265,968, has many improved properties such as thermal conductivity, flexural strength, impact resistance, and thermal stability. These materials are generally hot pressed as an admixture of graphite fibers of particular fiber orientation in particulate glass. Therefore, there is generally little difficulty in forming this material in any desired shape prior to hot pressing. Furthermore, it is also possible to hot press the intermediately formed composite into the desired design shape. However, for some applications, it is necessary to bond various pieces of these preformed, hot pressed composite materials together. Attempts at using conventional bonding materials such as epoxy, while meeting with limited success, are not compatible with the high temperature use some of these composite materials are primarily designed for and particularly adapted to, although for some less strenuous applications, conventional adhesives could be quite acceptable. Other attempts at forming usable bonded composite materials have included utilizing the glass matrix of the composite to effect a bond. Here also, while such attempts have met with limited success, the strength of the bond while adequate for some uses, has proven to be inadequate for the rigorous environments the composite materials are adapted to and were specifically designed for.

One attempt at solving this problem is disclosed in commonly assigned copending U.S. patent application Ser. No. 215,282, filed on even date herewith. This application discloses utilizing a glass based composition to bond graphite fiber reinforced glass matrix composites together. While this bonding method works quite satisfactorily, it does require relatively high temperatures, an inert atmosphere and high pressures. Accordingly, what is needed in the art is a relatively simple bonding method for fiber reinforced composites, and specifically graphite fiber reinforced glass composites, which provides a bond which maintains the strength and thermal properties of the composite.

DISCLOSURE OF INVENTION

The present invention is directed to a method of bonding a plurality of thermally stable high strength graphite fiber reinforced glass matrix composite materials. The process comprises applying to the two composite surfaces to be bonded at least one metal layer which adheres strongly to the composite material. The metal should be chosen so as to provide a strong bond to a subsequently applied solder layer. A layer of solder which strongly adheres to the metal surfaces is then placed between the metal coated surfaces to be bonded and the composite pieces so laid are then heated to melt the solder and bond the composite pieces. The metals and solder are chosen to be oxidation resistant and have a melting point higher than the use temperature of the bonded composite.

A composite graphite fiber reinforced glass article bonded according to the above recited process is also disclosed.

The foregoing, and other features and advantages of the present invention, will become more apparent from the following description and accompanying drawing.

BRIEF DESCRIPTION OF THE DRAWING

The FIGURE demonstrates a bonding process according to the present invention.

BEST MODE FOR CARRYING OUT THE INVENTION

Before bonding the graphite fiber reinforced glass composite pieces according to the present invention, the pieces are preferably cleaned. Conventional cleaning methods can be used, although ultrasonic cleaning in methanol followed by drying for one hour at about 200° C. is preferred. To further clean the surfaces to be bonded, they can be placed in a cathode sputtering apparatus and sputtered clean. As is conventional in this art, the cleaner the surface, the better the bond. One or more layers of the metal are then deposited on the bond surfaces of the composite. While any conventional method of depositing a thin layer of the metal may be used, for example, spraying or vapor deposition, cathode sputtering is preferred. The metals are preferably deposited in thin coatings, for example in thicknesses less than 2000 Å.

The basic requirement for the first metal layer deposited is that it provide a good bond layer for the glass and the solder. A problem in this area is that the solder does not generally adhere well to the glass. By providing a metal layer which adheres strongly to both the glass composite surface and the solder layer, this problem of weak bonding is overcome. However, as stated above, other requirements such as oxidation resistance and a melting temperature higher than the use temperature of the bonded composite is required for both the metal and the solder.

While any metal and solder combination which meets these requirements may be used, a chrome tie layer with an overcoat of gold and a gold-tin solder is a particularly desirable system (80% by weight gold, 20% by weight tin). In this particular embodiment, 800 Å of chromium was first deposited on the composite surfaces to be bonded followed by cathode sputtering of approximately 1 micron of gold on the deposited chromium. By depositing the chrome layer first, an improved bond for the subsequently applied gold layer is provided. Bonding is affected by raising the temperature of the composite-solder-composite to a sufficient degree to melt the solder. Some surface melting will take place at the surface of the deposited gold layers during solder melting resulting in a gold-solder gradient through a very small thickness of the deposited gold layers. Other combinations which may be used are a chrome tie layer with a gold metal overcoat and a gold-silicon or gold-germanium solder.

The two pieces with the solder layer in-between may be held together in any manner. It is preferred simply to stack the two pieces to be bonded on top of one another and heat to melt the solder layer. In fact, the method used to make the test samples is as shown in the FIGURE where 1 is the graphite fiber reinforced glass matrix composite material and 2 and 3 are the metal layers; in this case, 2 being the chromium tie layer, 3 being the gold layers, and 4 the gold-tin solder. As can be seen from the drawing, the solder was used in wire form and simply laid between the pieces to be bonded and the pieces placed one on top of the other with the solder in between. The temperature of the thus laid pieces is then raised sufficiently high to melt the solder and form the bond, in this case about 280° C. The heating can take place in a conventional oven or by simply placing the pieces thus stacked on a hot plate. This is one factor which makes this method particularly adapted to the graphite fiber reinforced glass composite pieces because of their high thermal conductivity. While the above process can be carried out entirely in air, heating in a vacuum furnace will obviously improve the bond.

Three different samples were made according to this method. While any fiber reinforced glass matrix composite can be used, the process is specifically designed for graphite fiber reinforced glass. The samples were tested by a short beam shear test. The short beam shear test was performed by supporting the samples on two points 1 inch (2.54 cm) apart and applying pressure from a third point on the opposite side of the sample equidistant from the other two points. In the three samples tested, a discontinuous graphite fiber reinforced glass composite was used. The results of these tests are shown in the Table. The first column represents the span to depth ratio of the sample. The second column is bond strength, and the last column, the description of the composite failure.

TABLE

| Span to Depth Ratio | Max. Shear Stress (MPa) | Nature of Break |
|---|---|---|
| 1.9 | 44.9 | Shear in material |
| 1.9 | 61.3 | Flexural & compression |
| 1.9 | 63.4 | Flexural & compression |

As can be seen from the sample testing, in no case did the bond fail, but in all three cases failure was in the composite itself.

While this bonding process has been described for graphite fiber reinforced glass composites, the process according to the present invention may be used for any fiber reinforced glass or glass-ceramic or ceramic composite. Specifically, the process is designed for bonding those composites disclosed in commonly assigned copending U.S. patent application Ser. Nos. 54,098, filed July 2, 1979; 92,168, filed Nov. 7, 1979; and 135,375, filed Mar. 28, 1980, the disclosures of which are incorporated by reference.

As described in the above patent applications, while any graphite fiber with the requisite high strength and good modulus of elasticity can be used in the composites of this invention, such as Hercules HMS graphite fiber, Celanese GY-70 (formerly DG102) graphite fibers are particularly suitable. This fiber consists of 384 fibers/tow and has an oxidized finish. It is 8 microns in diameter, has a modulus of elasticity of 531 GPa ($77 \times 10^6$ psi). It has a tensile strength of 1724 MPa ($250 \times 10^3$ psi) and a density of 1.96 gm/cm$^3$. The fiber is used at about 40% to 70% by volume based on the graphite-glass composite and preferably at about 60% by volume. Also, as described in these applications, the glass used in the composites of the present invention is particularly selected to have a very low coefficient of thermal expansion preferably matched closely, but not equal to that of the graphite fibers used since the graphite has a highly negative axial coefficient of thermal expansion, and the glass has a positive but small coefficient of thermal expansion. Particularly suitable for the purposes of this invention is a borosilicate glass (Corning Glass Works 7740) with an anneal point of 500° C., a softening point of 821° C., a liquidus temperature of 1017° C., a density of 2.23 grams per cubic centimeter, an index of refraction of 1.474, a dielectric constant of 4.6, a coefficient of linear expansion of 32.5 cm/cm°C.$\times 10^{-7}$ and a modulus of elasticity of $9.1 \times 10^6$ psi ($6.3 \times 10^7$ NT/M$^2$). The particle size of the glass should be such that at least 90% passes through a 36.0 mesh screen.

The main advantage of the bonding material of the present invention is that it allows fabrication and flexibility in design of the graphite reinforced glass composites described in the above recited patent applications without sacrifice in the improved strength, impact resistance and thermal stability of the composite material. For example, the resulting bond between composite pieces has stability over a wide range of temperature conditions. The bond strengths in excess of $6 \times 10^3$ pounds per square inch ($4.1 \times 10^7$ NT/M$^2$) are significant for any bonding material excluding the difficult bondability of the graphite fiber reinforced glass composites of the present invention.

The results of this process are quite surprising, i.e. a strongly bonded graphite-fiber reinforced glass composite material, since eutectics such as gold-tin do not normally wet graphite fibers and such alloys have a much higher coefficient of thermal expansion than graphite glass composite materials. However, as can be clearly seen from the Table, the bonds according to the present invention not only sufficiently wet the composites, but provided a strong composite bond as well.

Although this invention has been shown and described with respect to detailed embodiments thereof, it will be understood by those skilled in the art that various changes in form and detail thereof may be made without departing from the spirit and scope of the claimed invention.

I claim:

1. A process of bonding a plurality of thermally stable high strength graphite fiber reinforced glass matrix composite materials together comprising applying to all of the bond surfaces of the composite materials to be bonded comprising multiaxially oriented or discontinuous graphite fiber reinforced glass matrix composite materials containing about 40% to about 70% by volume graphite fibers, at least one thin layer of an oxidatively stable metal which is strongly adherent to the composite material and an appropriate solder, placing a solder layer between the bond surfaces of the composite materials and heating the composite materials to melt the solder and form the bond, the melting temperature of the metal and solder being higher than the use temperature of the bonded composite.

2. The process of claim 1 wherein the metal layers are deposited in thicknesses up to three microns.

3. The process of claim 1 wherein the bond produced has a strength of at least $6 \times 10^3$ psi ($4.1 \times 10^7$ NT/M$^2$).

4. The process of claim 1 wherein the graphite fibers have a modulus of elasticity of at least 531 GPa, a tensile strength of at least 1724 MPa, and a density of about 1.96 gm/cm$^3$.

5. The process of claim 1 wherein the composite contains graphite fibers having orientation in the composite of 0° and 90°; 0°, 45° and 90°; or 0° and 60°.

6. The process of claim 1 wherein a tie layer is deposited between the metal layer and the composite bond surface.

7. The process of claim 6 wherein the tie layer is chromium, the metal layer is gold, and the solder is a gold-tin mixture.

* * * * *